US008218490B2

(12) United States Patent
Rydnell et al.

(10) Patent No.: US 8,218,490 B2
(45) Date of Patent: Jul. 10, 2012

(54) GGSN PROXY FOR ONE TUNNEL SOLUTION

(75) Inventors: Gunnar Rydnell, V. Frölunda (SE);
Hans Bertil Rönneke, Kungsbacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 632 days.

(21) Appl. No.: 12/377,624

(22) PCT Filed: Aug. 16, 2006

(86) PCT No.: PCT/SE2006/000949
§ 371 (c)(1),
(2), (4) Date: Feb. 16, 2009

(87) PCT Pub. No.: WO2008/020787
PCT Pub. Date: Feb. 21, 2008

(65) Prior Publication Data
US 2010/0246500 A1    Sep. 30, 2010

(51) Int. Cl.
*H04W 4/00* (2009.01)
(52) U.S. Cl. ......... 370/329; 370/338; 370/341; 370/348
(58) Field of Classification Search .................. 370/328, 370/329, 331, 338; 709/224, 227, 245
See application file for complete search history.

(56) References Cited

U.S. PATENT DOCUMENTS

| 7,356,595 | B2* | 4/2008 | Soininen et al. | 709/227 |
| 7,782,818 | B2* | 8/2010 | Hurtta et al. | 370/331 |
| 2003/0079013 | A1* | 4/2003 | I'Anson | 709/224 |
| 2004/0243720 | A1* | 12/2004 | Haumont et al. | 709/245 |
| 2005/0254469 | A1* | 11/2005 | Verma et al. | 370/338 |
| 2006/0104262 | A1 | 5/2006 | Kant et al. | |

OTHER PUBLICATIONS

3GPP TR 23.873 V.4.0.0 (Mar. 2001) "Feasibility Study for Transport and Control Separation in the PS CN Domain" (Rel. 4).
3GPP TR 23.809 V.0.3.0 (Jul. 2006) "One Tunnel Functional description" (Rel 7).

* cited by examiner

*Primary Examiner* — Hassan Kizou
*Assistant Examiner* — Toan Nguyen
(74) *Attorney, Agent, or Firm* — Roger S. Burleigh

(57) ABSTRACT

A method for roaming of a wireless mobile communication unit, a service support node and a proxy gateway support node for roaming between Public Land Mobile Networks, as well as a mobile communication infrastructure network arranged to handle roaming between different PLMN areas, where the support node is located in a current PLMN and arranged to send a context request to a first service support node in another PLMN for a user equipment, receive a context response from the first service support node, send a context acknowledgement to the first service support node, send an update location message to a home location register of the user equipment, receive a relocate PDP context response from the second proxy gateway support node and send a relocate PDP context request to a second proxy gateway support node in the current PLMN.

13 Claims, 10 Drawing Sheets

A

B

GGSN PROXY FOR ONE TUNNEL SOLUTION

TECHNICAL FIELD

The present invention relates to the area of GPRS Core network and an enhanced architecture for delivery of GPRS payload between the radio network and an external packet data network through the GPRS PS core network.

BACKGROUND OF THE INVENTION

In 3GPP there is an initiative ongoing to define a GPRS enhancement known as the One Tunnel Solution (OTS). The method was proposed already in 3GPP Release 4 and elaborated in the TR 23.873 (see FIG. 1a). The TR proposes to remove the user plane from an SGSN (Serving GPRS Support Node) and send pay load directly between a GGSN (Gateway GPRS Support Node) and an RNC (Radio Network Controller). The control plane is still implemented in the SGSN node, which becomes a pure control signalling node without user plane. However, the proposal had certain shortcomings, e.g. the solution was not designed for roaming mobiles. For roaming, the user plane will be connected through the SGSN in the visited network (NW) towards the GGSN in the Home PLMN (Public Land Mobile Network), which means that the user plane can not be removed entirely from the SGSN.

To overcome the roaming problem an alternative architecture was proposed by Nortel, involving the so called GGSN Bearer Relay in the V-PLMN (see FIG. 1b). With this solution the user plane will in the roaming case pass through the visited GGSN and the RNC, without passing through the SGSN. The SGSN will be a pure control node. In the GGSN Bearer Relay solution, the control signaling for roaming users will be sent on an ordinary Gp interface between the V-SGSN and the Home-GGSN. Also there will be a Gn interface between the SGSN and the GGSN in the visited network. For a roaming user these two control interfaces will be used simultaneously for signaling to the H-GGSN and to the V-GGSN.

The GGSN Bearer Relay for the One Tunnel Solution solves some but not all problems of the original one tunnel Solution in Release 4.

1. There will be a security problem in the GGSN Bearer Relay. When the Gp interface is used for roaming users, the topology of the Visited PLMN will be openly visible outside the V-NW. The SGSN nodes and their IP addresses are exposed to the GRX and external networks in addition to the GGSN Proxy's. External control signaling is terminated in several less protected points deep inside the network, instead of in a few well protected points at the edge of the NW.
2. Firewall configurations are complex when CP (control plane) and UP (user plane) are split. Stateful firewalls are not possible since ISRAU (Inter SGSN Routing Area Update) will be reported outside of the V-PLMN.
3. PLMN Roaming problem. There is an issue in the GGSN Bearer Relay with MM (Mobility Management) procedures when roaming between different PLMN's. This is due to that the GGSN in the old VPLMN shall not be used anymore, and needs to be replaced with a GGSN in the new VPLMN.
4. Another problem with the current release-6 3GPP architecture is that PS (Packet Switched) based traffic, e.g. IP Telephony, is always routed to the Home-PLMN. There is no way to break out traffic locally in the Visited-PLMN. The GGSN Proxy provides an alternative for terminating PS traffic in the VPLMN. With a specific implementation in GGSN Proxy, a PDP Context may be forced to terminate in VPLMN. This may for example be very important when the PS domain shall support Emergency IP Telephony, where the caller needs to be connected to a local emergency call center in the VPLMN.

SUMMARY OF THE INVENTION

The object of the present invention is to provide a solution for solving at least some of the above mentioned problems. This is provided in a number of aspects in which a first aspect a method for roaming of a wireless mobile communication unit between Public Land Mobile Networks, i.e. PLMN, is provided comprising:

a. sending a context request from a second service support node in a second PLMN to a first service support node in a first PLMN;
b. receiving a context response in the second service support node from the first service support node;
c. sending a context acknowledgement from the second service support node to the first service support node;
d. sending a relocate Packet Data Protocol, i.e. PDP, context request from the second service support node to a second proxy gateway support node in the second PLMN;
e. sending an update PDP context request to a home gateway support node in a Home PLMN of the wireless mobile communication unit from the second proxy gateway support node;
f. receiving in the second proxy gateway support node an update PDP context response;
g. sending a relocate PDP context response to the second service support node from the second proxy gateway support node;
h. sending an update location message from the second service support node to a home location register in the Home PLMN of the wireless mobile communication unit;
i. receiving an update location acknowledgement message in the second service support node from the home location register.

The second proxy gateway support node may act as an intermediate node for all control communication in steps a to c, the first proxy gateway support node may act as an intermediate node for all control communication in steps a to c, or both the first proxy gateway support node and the second proxy gateway support node may act as intermediate nodes for all control communication in steps a to c.

The method may further comprise the steps of:
receiving a cancel location message from the home location register in the Home PLMN of the wireless mobile communication unit;
sending a delete relocated Packet Data Protocol, i.e. PDP, context request from the first service support node to a first proxy gateway support node in the first PLMN;
sending a delete relocated PDP context response to the first service support node from the first proxy gateway support node; and
sending a cancel location acknowledgement message to the home location register The method may further comprise the steps of
receiving traffic counting information from user equipment in the service nodes;
combining traffic counting information from the user equipment with traffic counting information from the service nodes in a charging message; and
sending the charging message to a home billing server.

A second aspect of the present invention, a service support node for roaming between Public Land Mobile Networks, i.e. PLMN, in a wireless mobile communication network protocol is provided, wherein the support node is located in a current PLMN and arranged with a processing unit arranged to:

send a context request to a first service support node in another PLMN for a user equipment;
receive a context response from the first service support node;
send a context acknowledgement to the first service support node;
send a relocate PDP context request to a second proxy gateway support node in the current PLMN;
receive a relocate PDP context response from the second proxy gateway support node;
send an update location message to a home location register of the user equipment;
receive an update location acknowledgement message from the home location register;

The support node processing unit may further be arranged to:
receive a cancel location message from the home location register;
send a delete relocated PDP context request to a first proxy gateway support node;
receive a delete relocated PDP context response from a first proxy gateway support node; and
send a cancel location acknowledgement message to the home location register.

Yet another aspect of the present invention, a proxy gateway support node for roaming between PLMN areas in a mobile wireless communication network is provided, wherein the proxy support node is arranged with a processing unit to:
receive a relocate Packet Data Protocol, i.e. PDP, context request from a second service support node;
send an update PDP context request to a home gateway support node;
receive an update PDP context response from the home gateway support node;
send a relocate PDP context response to the second service support node;

The proxy support node processing unit may further be arranged to:
receive a delete relocated Packet Data Protocol, i.e. PDP, context request from a first service support node; and
send a delete relocated PDP context response to the first service support node.

Still another aspect of the present invention, a mobile communication infrastructure network arranged to handle roaming between different PLMN areas is provided, comprising
at least one service support node;
at least one gateway support node; and
at least one proxy gateway support node as described above;
wherein the proxy gateway support node is located between the gateway support node and the service support node.

The signaling within the mobile infrastructure network may be performed between at least one service support node and at least one proxy gateway support node, while signaling outside the mobile infrastructure network is performed between at least one proxy gateway support node and one other proxy gateway support node or at least one gateway support node.

The network may further comprise a firewall located communicatively between the gateway support node and the proxy gateway support node on the home PLMN side or the visited PLMN side.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

The basic Concept of this invention is to include a GGSN Proxy in the One Tunnel Solution (OTS). The difference between the GGSN Proxy solution and the GGSN Bearer Relay is that the GGSN Proxy does the signaling to a HPLMN GGSN (Home Public Land Mobile Network Gateway GPRS Support Node), instead of a control-SGSN. The GGSN Proxy acts as an SGSN towards the HPLMN GGSN and hence a standard Gp interface can be preserved between operators.

In general, from a security point of view the GGSN Proxy solution follows a "choke-point principle"; it is better to terminate external traffic in a few well protected points at the edge, than in many less protected points deep inside the network. Some firewall related security aspects for GGSN Proxy has been presented earlier with respect to GGSN proxy solution, where some protection in the Home-PLMN case is suggested. The present invention is more general and also describes security enhancements in the Visited-PLMN case.

The GGSN Proxy can also be a possible point for emergency breakout in the Visited-PLMN. In current GPRS networks the PS domain traffic for a roaming subscriber is always routed to the home NW and there are no means for terminating the traffic in the visited network.

Figure 1:
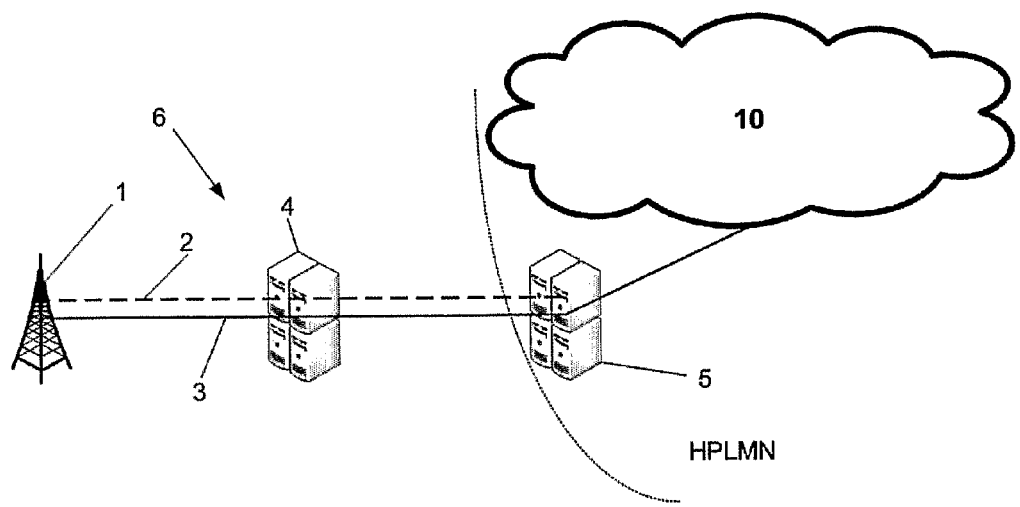
FIG. 1a and b illustrates schematically two embodiments of known solutions.
Figure 1:
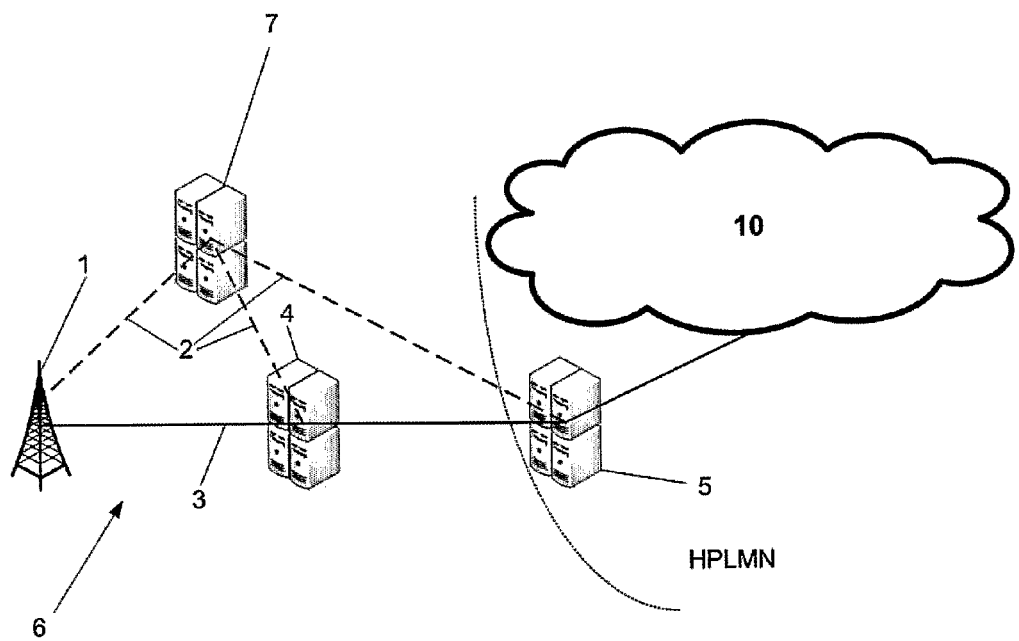
Figure 2:
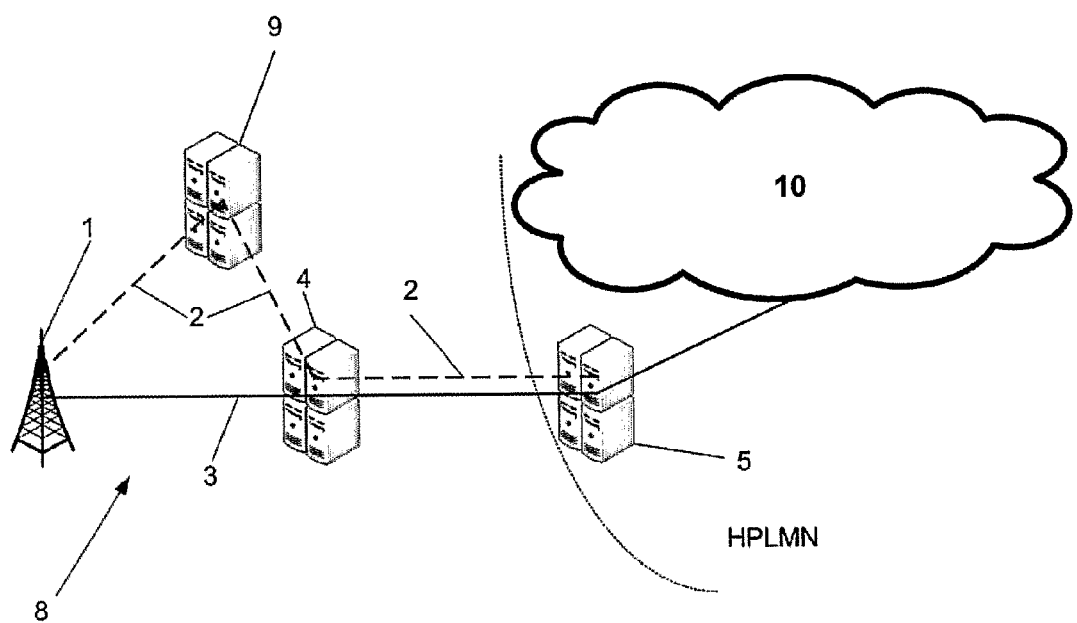
FIG. 2 illustrates schematically a GGSN proxy architecture according to the present invention.

The GGSN Proxy architecture according to the present invention is shown schematically in FIG. 2, wherein reference numeral 8 denotes a network according to the present invention. A UE (not shown) communicates with a wireless mobile communication network 8 via a radio network controller 1 which in turn is connected with signaling connection 2 to a control SGSN 9 in turn connected to a GGSN proxy 4 which relays control signals to a home PLMN GGSN 5. Payload traffic 3 is transported directly from the RNC to the HPLMN via the GGSN proxy 4. The GGSN Proxy 4 relays the signaling to the HPLMN GGSN 5, instead of the control-SGSN 9. The GGSN Proxy 4 acts as an SGSN towards the HPLMN GGSN 5 and hence a standard Gp interface can be preserved between operators.

When the control-SGSN during the PDP Context Activation procedure finds an APN (Access Point Name) belonging to another PLMN, it selects a GGSN Proxy for handling the roaming traffic and sends a Create PDP Context Request message to that node instead. A new IE (Interface Element) with a list of IP addresses to the Home GGSN is included in the Create PDP Context Request. The presence of this IE is what makes a GGSN know it shall act as a GGSN Proxy instead of as a normal GGSN.

The GGSN Proxy creates the PDP Context, allocates additional TEIDs (Tunnel End-point IDentifier) for the Gp interface and forwards the Create PDP Context Request message with these TEIDs to the GGSN corresponding to the APN. The response message from the GGSN is returned/forwarded by the GGSN Proxy to the SGSN.

Mobility management procedures are handled in the same way as for the One Tunnel Solution for non-roaming traffic, with the GGSN in the HPLMN not involved in the procedure.

The GGSN Proxy forwards all modifications of PDP Contexts to the GGSN in HPLMN, unless the modification is only of local significance (e.g. updating TEIDs and IP addresses).

ISRAU and Firewalls for GGSN Proxy

Figure 3:
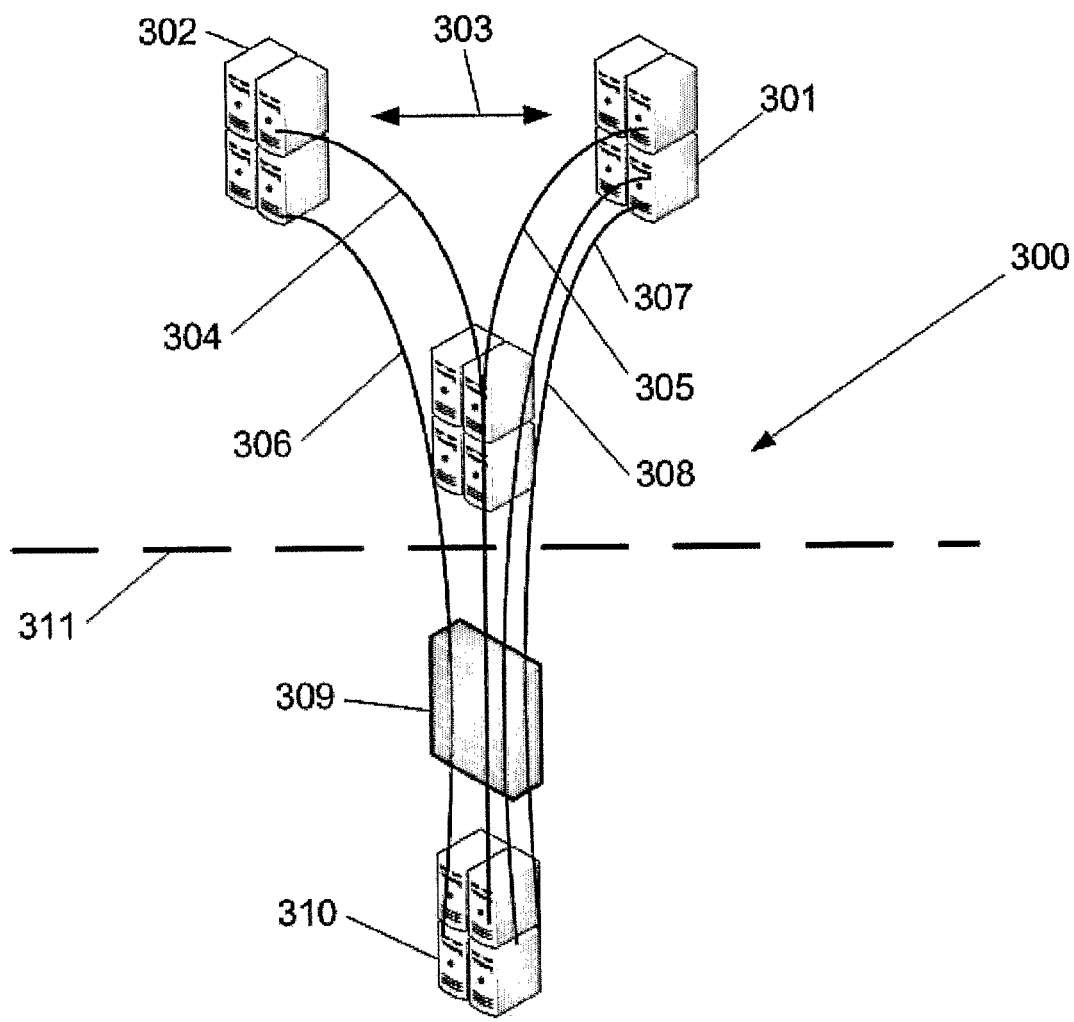
FIG. 3 illustrates schematically firewall enhancements with GGSN proxy according to the present invention.

FIG. 3 shows a GGSN Proxy scenario and the enhanced possibilities for how firewalls can be designed in accordance with the present invention.

The improvement in this scenario is that the Firewall only sees the GGSN Proxy. Thereby handovers within a remote operator can be handled with stateful fire-walling. Handovers between PLMNs are rarely supported by operators, and may be handled specifically when supported, e.g. by configuring the IP addresses of which other operators' GGSN Proxies are allowed to send in Update PDP Context messages to take over a GTP tunnel.

A firewall fabric can normally not associate flows with different IP addresses and ports. GTP allows use of different IP addresses and ports for different messages, and even change of IP addresses on the fly. Using a GGSN proxy would make it easier to maintain the local IP address through the firewall independent of SGSN and GGSN signaling. A GGSN Proxy would also facilitate GTP interoperability over GRX. Support for headers in the GTP protocol can be bound to GGSN-proxy (and not implemented in the firewall) which would make it easier to maintain GTPv1 for Gp traffic. That is, no need to back off to GTPv0 due to unknown headers.

Topology Hiding with GGSN Proxy

The improvement in this scenario is that the SGSN's do not need to be exposed to external networks. All signaling can pass the GGSN Proxy and hence the only IP addresses that need to be provided to external networks are the IP addresses of the GGSN Proxy. This method according to the present invention may also be used during inter PLMN roaming without exposing any SGSNs to external networks and is illustrated and described more in detail below with reference to FIG. 4b.

Accordingly, this would be in line with the well known "choke-point principle", that is, it is better to terminate insecure external traffic in a few well protected points at the edge, than in many less protected points deep inside the network. The GGSN Proxy can be such a well protected point. The firewall configurations setup in these few points can be more efficient and cost effective. The GGSN Proxy as such is also generally less vulnerable to large amounts of traffic, e.g. Denial of Service (DoS) attacks, than SGSN since the GGSN is from the very beginning meant as an edge node and as such has higher performance, better filter capabilities, and is designed with edge characteristics.

The Gp interface of the GGSN Proxy can then be connected to a separate sub-network which is connected to external networks, e.g. the GRX network. The address of this sub-network is then advertised by the boarder routers to the GRX or other Inter-PLMN networks or exchanges. The GGSN Proxy may also be configured as a boarder router itself.

Figure 4A:
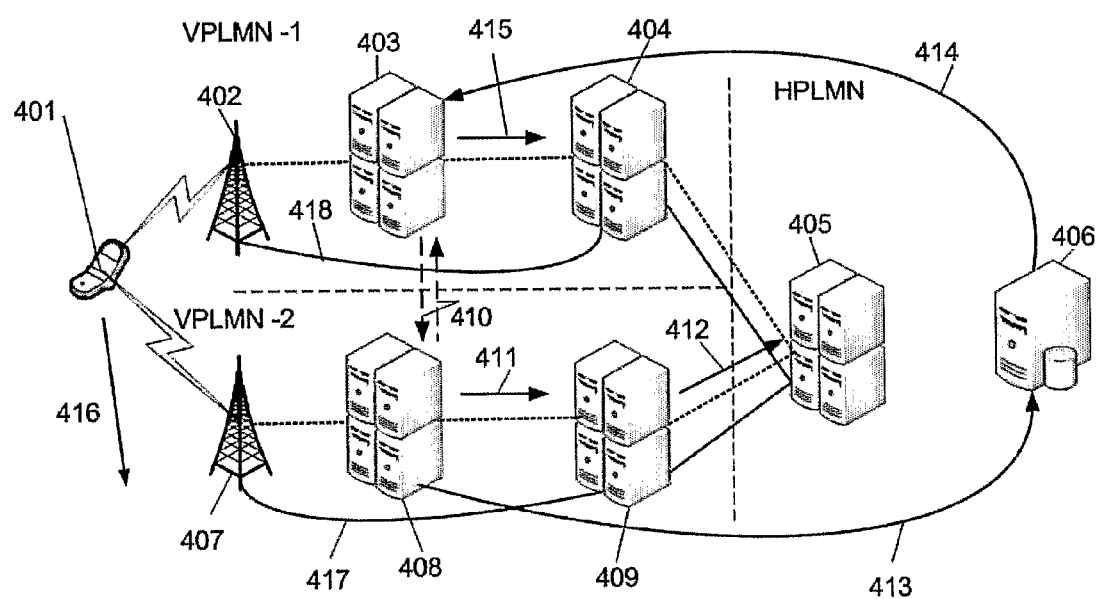
FIG. 4a illustrates schematically PLMN roaming according to one embodiment of the present invention.
Figure 4B:
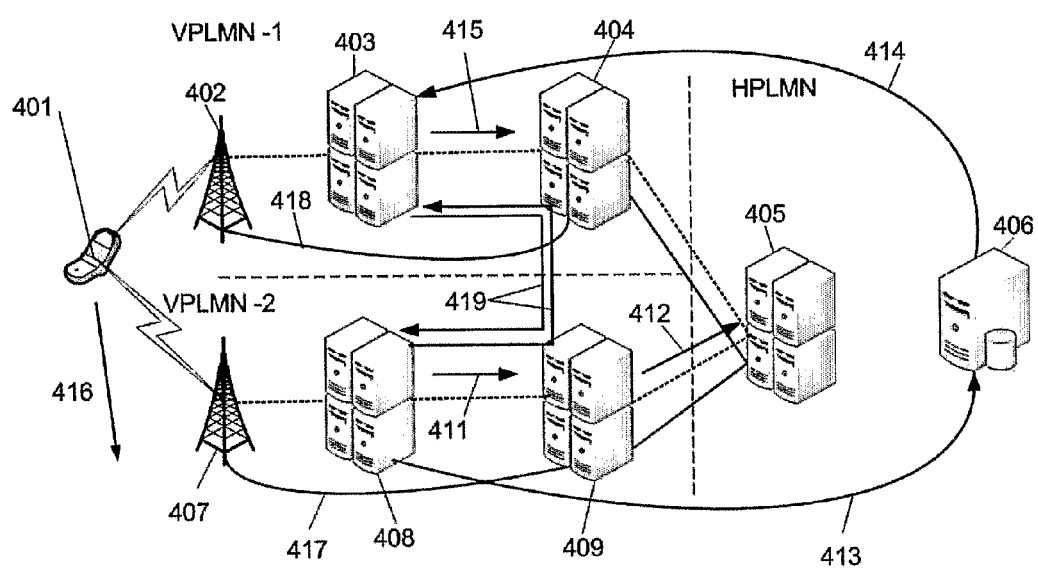
FIG. 4b illustrates schematically PLMN roaming according to another embodiment of the present invention.

To be able to handle a PLMN roaming (e.g. using ISRAU, SRNS relocation or PS Handover), it is proposed to use a principle as illustrated in the FIG. 4a or 4b. In FIGS. 4a and 4b the reference numeral 401 generally denote a UE and the arrow 416 illustrates how the UE 401 moves from one PLMN to another PLMN. The UE 401 communicate with a RNC 402, 407 which in turn communicate with a SGSN 403, 408 in each of the VPLMN-1 and VPLMN-2. The SGSN's communicate each with a respective GGSN proxy 404, 409 which in turn communicate with a GGSN 405 in the HPLMN of the UE 401. The RNCs can be in contact 417, 418 with the GGSN proxies 404, 409 in respective VPLMNs. In the HPLMN also a HLR 406 is located. The only difference between alternative 1 in FIG. 4a and alternative 2 in FIG. 4b is step 1, i.e. how the contexts are retrieved from the old SGSN. In alternative 1 the two SGSN's have direct contact 410 (i.e. over an external network e.g. GRX) and in alternative 2 the SGSN's communicate 419 via the GGSN Proxies 404, 409. In alternative 2 the topology hiding discussed above can be maintained, i.e. only GGSN Proxies exposed to external networks. When a GGSN Proxy receives a SGSN Context Request it uses the normal procedure translating the Old RA to find the destination node. For this purpose the GGSN Proxy has a translation table configured (Old RA->GSN Node address) for the other networks the operator has roaming agreement with. A cache may also be used for holding sent messages, the cashe may be used when response messages returns in order to know where to forward them. The cache may be present in the old GGSN proxy to find the new GGSN proxy (or SGSN) and in the new GGSN proxy for finding the correct new SGSN. For instance the latest message that was sent may be stored in the cache which may be removed when a new message is stored, when the last message has been sent after a session, or after a time out period.

1. At some point in the MM procedure, the PDP Contexts are moved over to the new SGSN 408 in the new VPLMN. The content of these messages should be unchanged, which guarantees the interoperability between operators using Rel-7 OTS Networks and operators using Rel-6 or older networks. If the operator uses One Tunnel and has deployed the increased security that GGSN Proxy allows, alternative 2 above is used otherwise alternative 1.
2. A new message is added (Relocate_PDP_Context_Request 410) that the new SGSN 408 can use (if it uses OTS) to create a new PDP Context in the GGSN Proxy 409. A Relocate_PDP_Context_Response message 411 is sent back as an acknowledged by the GGSN Proxy 409. If the new VPLMN doesn't use OTS it just uses to the normal MM procedure (sends an Update PDP Context 412 to GGSN in HPLMN and continues on step 4 below).
3. The GGSN Proxy 409 creates the PDP Context but it doesn't forward the creation to GGSN 405, but only sends an Update PDP Context 412 to GGSN 405, since the PDP Context already exists in the HPLMN.
4. The new SGSN 408 sends Update Location 413 to the HLR 406, which is acknowledged by the HLR 406.

5. When the old SGSN 403 receives a Cancel Location message 414 from HLR 406, it knows if a GGSN Proxy 409 was used for the PDP Contexts.
6. If the old SGSN 403 used a GGSN Proxy 404 (i.e. uses OTS) it sends a new message (Delete_Relocated_PDP_Context_Request 415) to the GGSN Proxy 404 in the old VPLMN. The old GGSN Proxy 404 then deletes the PDP Context without forwarding anything to the GGSN 405 and returns an acknowledge to the old SGSN 403 (Delete_Relocated_PDP_Context_Response). The old SGSN 403 then deletes its PDP Context. If the old SGSN 403 doesn't use OTS it just deletes its PDP Context (indicated by Cancel Location). The Cancel Location from HLR 406 is acknowledged.

This way of signaling can function regardless of if any of the VPLMN-1 and VPLMN-2 uses OTS or not, and regardless of any of them are pre-rel-7 networks. That is, it is not a requirement that both VPLMNs support OTS. The procedure will still work. It all depends on what the SGSN does, and for alternative 2 it also depends on what nodes the translation tables points to. An operator, who uses OTS and has deployed topology hiding using GGSN Proxies, provides the addresses to his GGSN Proxies instead of to his SGSNs to his roaming partners (valid for all RAs in his network).

Using the GGSN Proxy as the only interface to other operators' networks, may also simplify the process for establishing roaming agreements between operators. Only the addresses to each operator's GGSN Proxy needs to be exchanged. These are then valid for any RAI in the other operator's network.

The translation table that is used in a GGSN Proxy to have full Topology Hiding and a simplified roaming agreement configuration should be a 'bi-directional' translation table. 'Foreign' Old RAIs for outgoing requests shall be translated to one external GGSN Proxy, and for incoming requests shall RAIs to the own PLMN be translated to the correct SGSN. The beauty of this is that the translation becomes very simple if a roaming partner uses GGSN Proxy. All RAIs of that PLMN is then translated to one single external GGSN Proxy. This will facilitate inter PLMN roaming agreements and configurations to a great extent and make it feasible in practice. For redundancy reasons, more than one GGSN Proxy may be used to have alternatives if an external GGSN Proxy doesn't respond.

Regional Roaming and GGSN Proxy

Figure 5:
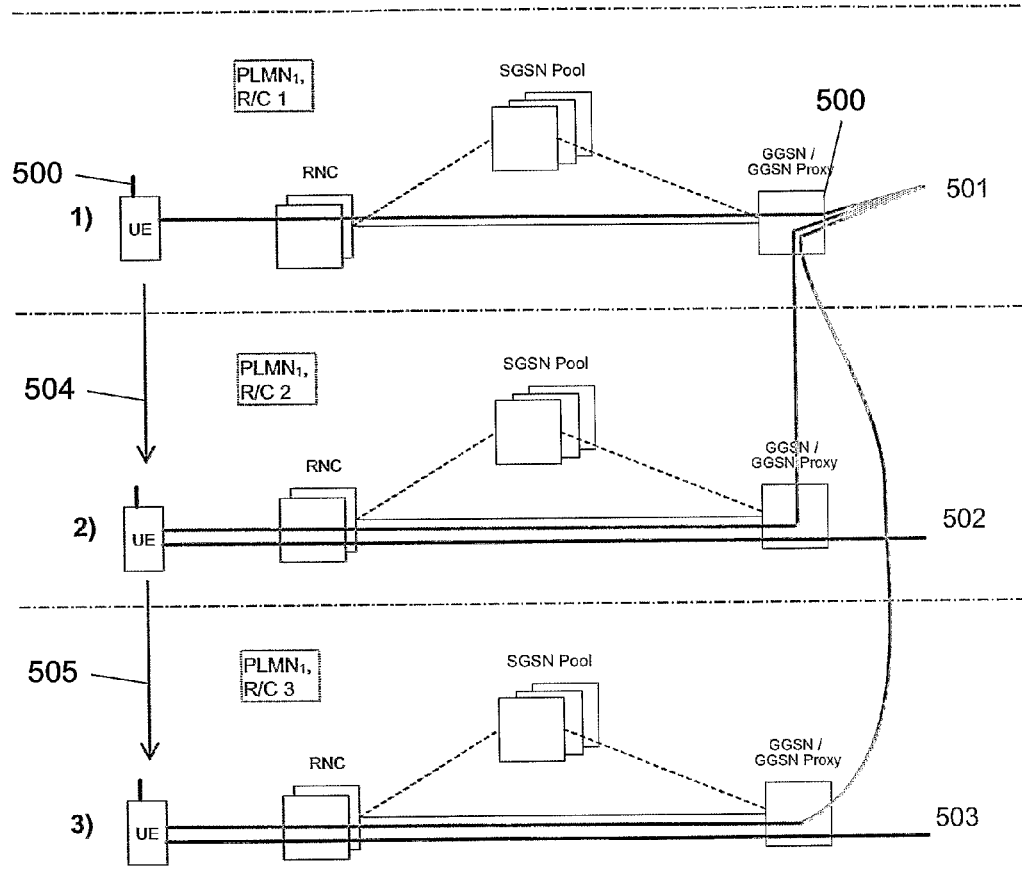
FIG. 5 illustrates schematically regional roaming according to the present invention.

The procedure for changing the GGSN Proxy in PLMN Roaming cases can be used for "regional roaming" with one single PLMN as well. In very large networks (e.g. in China) operators may find it desirable to divide the PLMN into smaller sub-networks and apply special roaming and traffic optimization procedures. FIG. 5 described below gives some examples.

In step 1) in FIG. 5 a UE 500 establishes PDP contexts to a GGSN in its own region R/C1. Both "normal traffic" and any emergency calls may terminate in this GGSN 506 (line 501). While connected the UE 500 moves 504 to another city/region R/C2 that has a separate network configuration. The SGSN in the new region (possibly in a new pool) the UE gets connected to identifies it was connected to an SGSN in another region and then selects a GGSN Proxy for the UE 500. The procedure described earlier with reference to FIGS. 4a and 4b updates the PDP context(s) to connect via the GGSN Proxy in Region 2 to the GGSN in Region 1 as shown in step 2) in the figure above. When required a locally terminated PDP context as shown in step 2) (line 502) may also be established. The GGSN Proxy in region 2 may for example force an emergency PDP context to be established locally, and hence the GGSN Proxy in that case will instead be taking a role as a GGSN. Locally terminated PDP contexts may also be established in other ways. For example, may the establishment of a locally terminated PDP context be initiated by the GGSN Proxy after the PLMN roaming procedure (described in FIGS. 4a and 4b). In step 3) the UE 500 moves 505 to yet another city/region R/C3 that has a separate network configuration. The procedure described for step 2) above is repeated. Any locally terminated PDP Context in step 2) is deactivated and replaced by a new locally terminated PDP context in region 3 (line 503).

Figure 6:
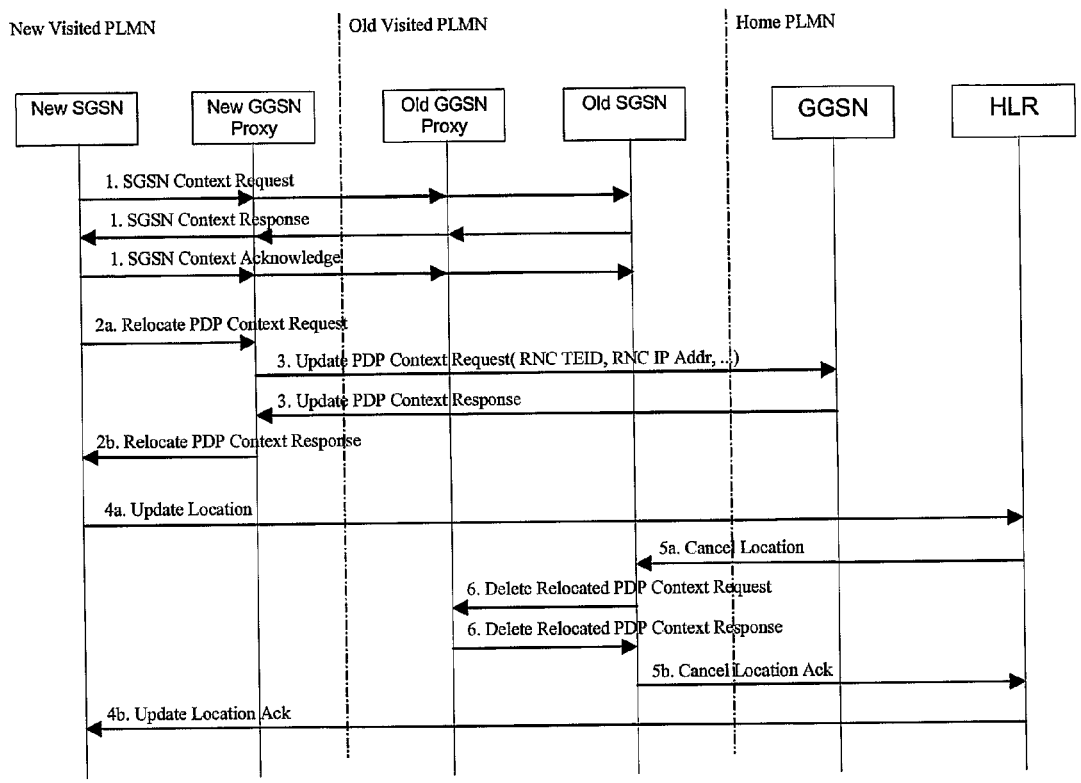
FIG. 6 illustrates schematically a signaling process for PLMN roaming according to one embodiment of the present invention.

The signaling diagram for PLMN roaming showed in FIG. 6 is a generic procedure that can be applied on Mobility Management procedures in general when the GGSN Proxy needs to be changed. This is normally when a UE moves between two PLMNs, but may also be within a single PLMN e.g. when separate network configurations are used for different regions within the PLMN. For the case when both the new and the old PLMN supports OTS and alternative 2 is used (GGSN Proxies acts as intermediate nodes for the SGSN Context Request—FIG. 4b), step 1 is sent New SGSN->New GGSN Proxy->Old GGSN Proxy->Old SGSN and then back Old SGSN->Old GGSN Proxy->New GGSN Proxy->New SGSN. For the case when only the new PLMN support OTS, step 1 is sent New SGSN->New GGSN Proxy->Old SGSN and then back Old SGSN->New GGSN Proxy->New SGSN. And for the case when only the old PLMN support OTS, step 1 is sent New SGSN->Old GGSN Proxy->Old SGSN and then back Old SGSN->Old GGSN Proxy->New SGSN. The rest of the signaling is as follows:

2a. Relocate PDP context is sent from new SGSN to new GGSN proxy within the new visited PLMN.
3. Update PDP context request (RNC TEID, RNS IP address and so on) is sent from the new GGSN proxy to the GGSN in the Home PLMN.
3. An update PDP context response is sent from the GGSN in the Home PLMN to the new GGSN proxy.
2b. A relocate PDP context response is sent from the new GGSN proxy to the new SGSN.
4a. An update location message is sent from the new SGSN to the HLR.
5a. A cancel location message is sent from the HLR to the old SGSN in the old visited PLMN.
6. A delete relocated PDP context request message is sent from the old SGSN to the old GGSN proxy.
6. A delete relocated PDP context response is sent from the old GGSN proxy to the old SGSN.
5b. A cancel location acknowledgement message is sent from the old SGSN to the HLR.
4b. An update location acknowledgement message is sent from the HLR to the new SGSN.

Figure 7:
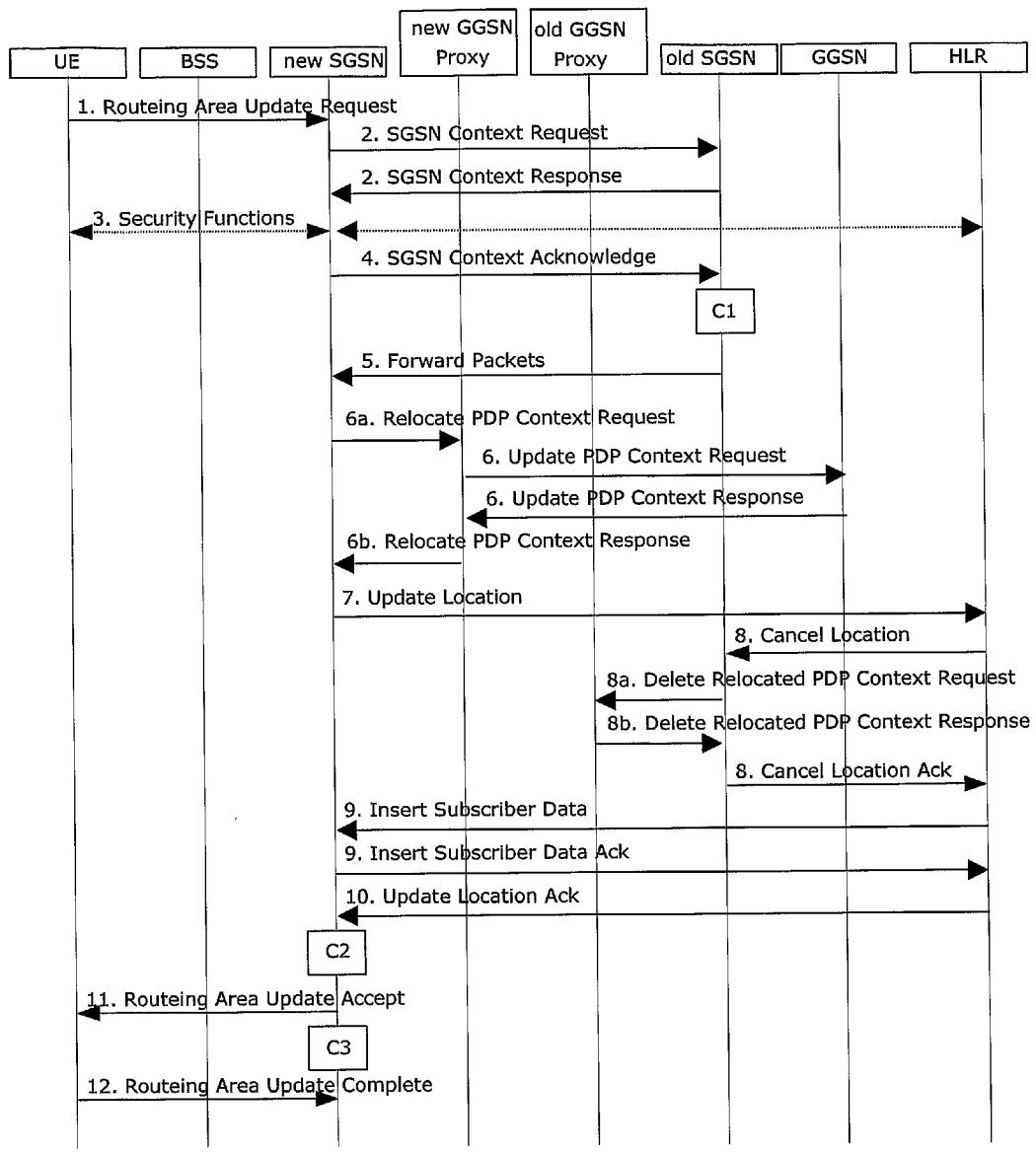
FIG. 7 illustrates schematically a signaling process for PLMN roaming according to another embodiment of the present invention.

FIG. 7 shows what it looks like when this generic procedure is applied on Inter SGSN Routing Area Update (sub clause 6.9.1.2.2 in TS 23.060), ISRAU. However, it should be noted that the invention also is applicable to other mobility procedures, for instance but not limited to PS handover, hard handover, and SRNS (serving radio network subsystem) relocation procedure. In FIG. 7 C1, C2 and C3 denote standard functions related to CAMEL and are understood by the person skilled in the art. The signaling scheme is as follows in this example:

1. A routing area update request message is sent from the UE to the new SGSN through the BSS.
2. An SGSN context request is sent from the new SGSN to the old SGSN.
2. The old SGSN sends a SGSN context response.
3. Security functions are handled at this point.

4. The new SGSN sends a SGSN context acknowledgement message to the old SGSN. C1 may be performed at this stage.
5. The old SGSN forwards packets.
6a. The new SGSN sends a relocate PDP context request message to the new GGSN proxy.
6. The new GGSN proxy sends an update PDP context request to the GGSN in the HPLMN.
6. The GGSN in the HPLMN sends an update PDP context response.
6b. A relocate PDP context response is sent from the new GGSN proxy to the new SGSN.
7. An update location message is sent from the new SGSN to the HLR in the HPLMN.
8. The HLR sends a cancel location message to the old SGSN.
8a. The old SGSN sends a delete relocated PDP context request to the old GGSN proxy.
8b. A delete relocated PDP context response is sent from the old GGSN proxy to the old SGSN.
8. A cancel location acknowledgement message is sent from the old SGSN to the HLR.
9. The HRL inserts subscriber data to the new SGSN.
9. The new SGSN sends an insert subscriber data acknowledgement message to the HLR.
The HLR sends an update location acknowledgement message to the new SGSN. C2 may be performed.
11. The new SGSN sends a routing area update accept to the UE. C3 may be performed.
12. The UE sends a routing area update complete message to the new SGSN.

Figure 8:
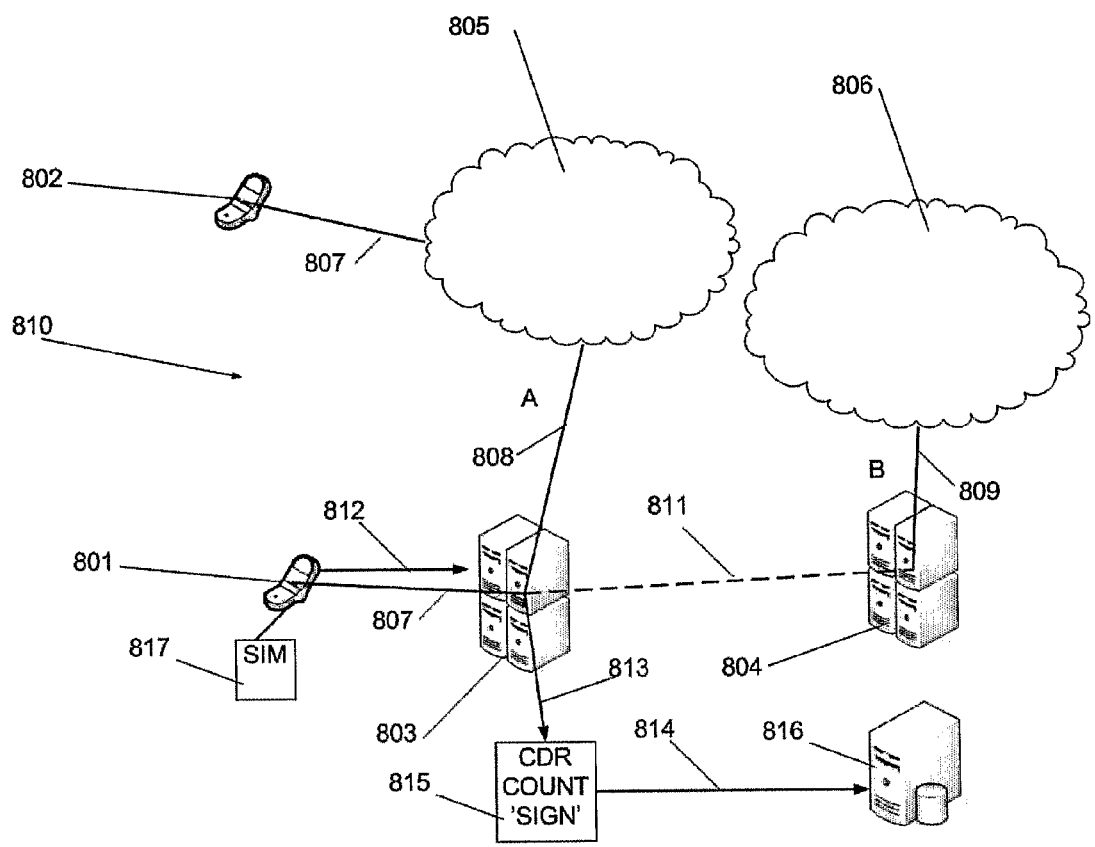
FIG. 8 illustrates schematically a network according to the present invention.

FIG. 8 illustrates a general network solution according to the present invention with a local breakout method implemented. In FIG. 8 reference numeral 810 generally indicate a communication network for which the present invention operates within. A user equipment (UE) is connected to a visiting public land mobile network (VPLMN) 803 away from a home public land mobile network (HPLMN) 804. The present invention relates to a situation where the visiting UE 801 communicates with another UE 802 and instead of communicating with the HPLMN 804 of the visiting UE 801 one would be interested in communicating directly via the VPLMN 803 in order to reduce traffic routing between different network components. The network 810 further comprises communication links 807 between the UE 801, 802 and infrastructure communication link 811 between the VPLMN 803 and HPLMN 804. The VPLMN 803 and HPLMN 804 may be connected to respective communication networks 805 and 806 with respective communication links 808 and 809. Traffic between the visiting UE 801 and the other UE 802 is sent on a local breakout path A 808, without passing the Home PLMN 804.

The UE 1 has software SW that is able to count traffic volumes that pass through it, with an arbitrary accuracy and granularity, and at some trigger point, with the help of a SIM (Subscriber Identity Module) 817 attached to the UE 801, generate a cryptographic digital signature, 'SIGN' with the traffic counting information, which is sent 812 together with the traffic report, to the network, i.e. for instance to the VPLMN 803 or directly to the HPLMN 804.

The Visited network 803 has the ability to catch the new information element, traffic report and 'SIGN', and insert it in the next CDR 815 produced 813 by the VPLMN 803 that is sent 814 for the UE 1 to the Home Operator, for instance to a Home Operators billing system 816 or a billing agent acting as an intermediate communication broker.

The Home Operator billing system 816 can decipher the information traffic report and 'SIGN' and use it to validate the correctness of the counted bytes that the Visited Network and the user equipment 801 have reported. The local breakout method and implementations in respect to topology hiding has been discussed in another patent application with application number PCT/EP2006/006453 which is incorporated with reference into this application.

Figure 9:
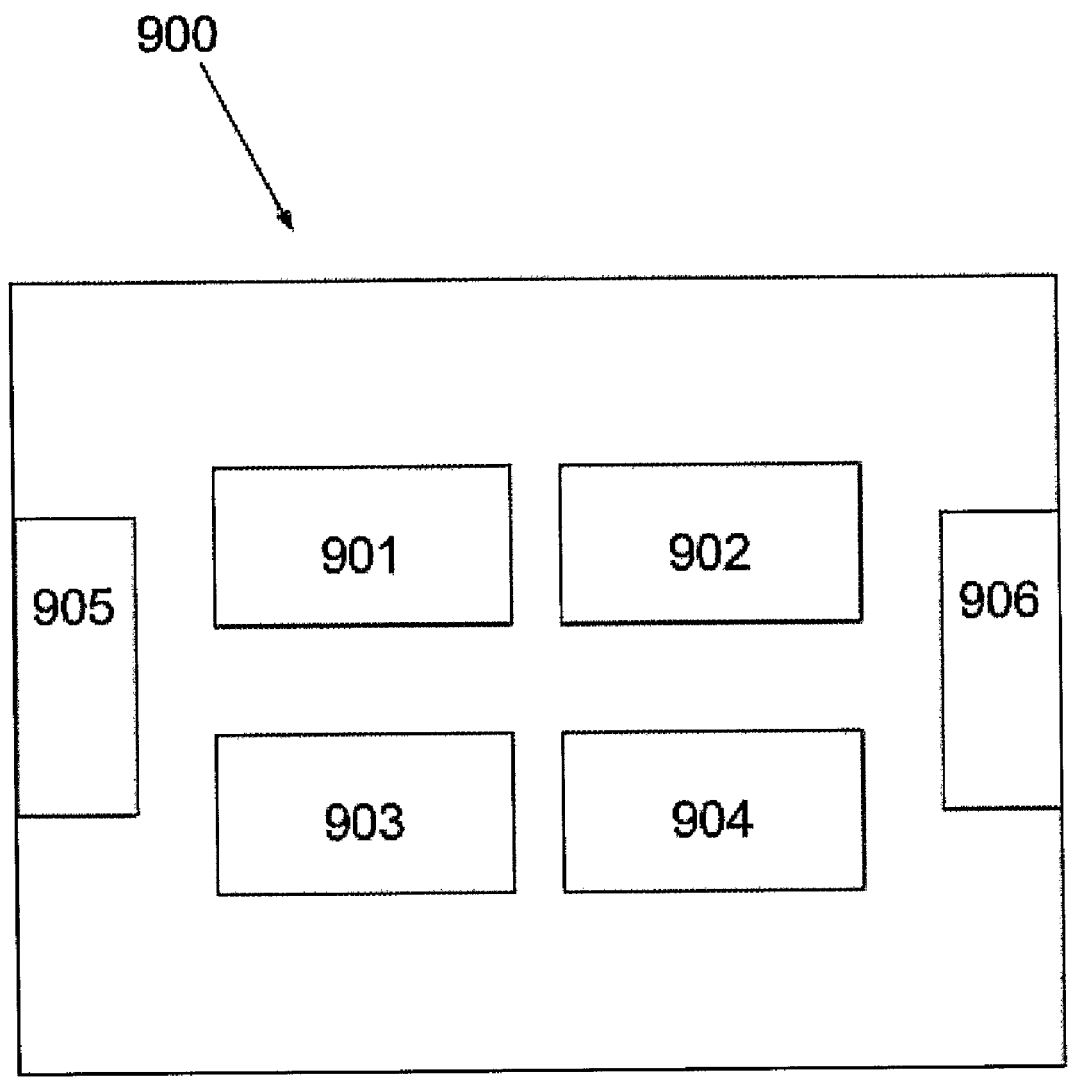
FIG. 9 illustrates schematically a GGSN proxy device according to the present invention.

Turning now to FIG. 9, illustrating in a schematic block diagram an infrastructure node (GGSN proxy or SGSN) according to the present invention (e.g. a support node), wherein a processing unit 901 handles communication data and communication control information. The infrastructure node 900 further comprises a volatile (e.g. RAM) 902 and/or non volatile memory (e.g. a hard disk or flash disk) 903, and an interface unit 904. The infrastructure node 900 may further comprise a downstream communication unit 905 and an upstream communication unit 906, each with a respective connecting interface. All units in the infrastructure node can communicate with each other directly or indirectly through the processing unit 901. Software for handling communication to and from the mobile units attached to the network is at least partly executed in this node and may be stored in the node as well; however, the software may also be dynamically loaded upon start of the node or at a later stage during for instance a service interval. The software can be implemented as a computer program product and distributed and/or stored on a removable computer readable media, e.g. diskette, CD (Compact Disk), DVD (Digital Video Disk), flash or similar removable memory media (e.g. compactflash, SD secure digital, memorystick, miniSD, MMC multimediacard, smartmedia, transflash, XD), HD-DVD (High Definition DVD), or Bluray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the GGSN proxy node).

ADVANTAGES OF THE PRESENT INVENTION

Benefits with GGSN Proxy compared to GGSN Bearer Relay and compared to current 3GPP ReI-6:
1. The GGSN Proxy may simplify PLMN roaming. With roaming alternative 2, only one single IP address (to a GGSN Proxy) is required to be exchanged to enable roaming between two PLMN's. Today IP addresses to all or a range of RAs need to be exchanged in a PLMN roaming agreement. This may reduce costs for operators roaming agreements significantly. Of course IP addresses of two or more GGSN Proxies may be exchanged for redundancy or capacity reasons. With simplified PLMN roaming procedures, PLMN roaming may be a reality in practice!
2. Increased security in core network. Topology hiding enables the internal CN backbone (Gn and Iu networks) to be isolated from the GRX and other external networks. With separate Gp interfaces in the SGSN Gp isolation has been possible already before, but now no SGSNs at all need to be open to externally. Only one or a few GGSN Proxies which can be placed at the boarder between the PLMN and external networks. This simplifies network design significantly. The topology of the CN is also completely hidden from externally. No SGSNs or RNCs will be reachable or known from outside the PLMN.
3. The topology hiding and the simple network design using GGSN Proxies at the boarder may also simplify other specific needs an operator has. For example usage of private IP addresses in the CN, and facilitate migration to IPv6. The placement of IPv4 to IPv6 address translation points (NAT-PTs) may be facilitated by the simpler network design at the boarder. The GGSN Proxy may even be used as a protocol translator (NAT-PT).

4. Using the GGSN proxy solution may make Inter PLMN roaming agreements between operators easier to establish which will create the possibility for keeping PS application, e.g. VoIP, operative during roaming between PLMNs. Less information is necessary to interchange using the GGSN proxy solution as compared to the current solution. It is enough to configure in the GGSN proxy the address to the cooperating operators GGSN proxy, it is therefore not necessary to configure all SGSN addresses for all the other operators RA's.

5. With the GGSN Proxy certain network features can be concentrated to the GGSN (charging, policy control, LI) and can then apply to all traffic regardless if it is non-roaming or roaming traffic. This enables better features and simplifies network configurations. Today an operator who has deployed charging functions in the GGSN is still required to maintain charging functions in SGSN for the visiting traffic. And policy control for roaming (visiting) traffic is not possible to deploy with today's standards.

6. Optimized user plane traffic, which may save transport costs. The traffic does never have to be routed through the SGSN and can always take the shortest path between the RNC and the GGSN.

7. The user plane traffic is routed in predictable paths in the CN. With the user plane completely removed from SGSN, the user plane traffic will always be routed along the same paths in the CN regardless if traffic is roaming, LI is done, etc. This should simplify network design and facilitate usage of different 'probes' in the network (for charging, traffic monitoring, different proxies etc).

8. Enables local breakout of emergency traffic. For roaming traffic, the GGSN Proxy is a natural point to terminate specific PDP Contexts which for example can be used for connecting emergency IP telephony to local emergency centers.

9. No user plane traffic in 3G SGSN may allow simplified and more cost efficient SGSN products. The remaining user plane hardware in existing dual access 2G/3G SGSN's may be used to handle increased 2G traffic.

10. CP and UP are not split (compared to GGSN Bearer Relay alternative). This can make firewall configurations less complex. Error handling may also become simpler (both CP and UP in the same node). For example node restart becomes less complex—no distributed states as in the GGSN Bearer Relay proposal.

The term roaming as it has been used in this context is defined as the ability for a cellular customer to automatically make and receive voice calls, send and receive data, or access other services when traveling outside the geographical coverage area of the home network, through a visited network; the visited network may be owned by the operator to which the customer belongs to or it can be owned by an external operator. Roaming is technically supported by mobility management procedures and, authentication, authorization, and accounting procedures. Establishing roaming between network operators is based on roaming agreements between operators directly or indirectly through roaming brokers or agents. If the visited network is in the same country as the home network, this is known as national roaming. If the visited network is outside the home country, this is known as international roaming.

Billing and charging issues are dealt with in relation to the present invention according to standard procedures for instance through an AAA (Authentication, Authorization and Accounting) protocol between entities of the networks, e.g. through protocol like RADIUS (Remote Authentication Dial in User Service) or Diameter. However, with the local breakout method enabled also the UE is involved in traffic counting and this data is reported together with traffic counting data from the visited PLMN to the home PLMN as described earlier in this document.

It should be noted that the word "comprising" does not exclude the presence of other elements or steps than those listed and the words "a" or "an" preceding an element do not exclude the presence of a plurality of such elements. The invention can at least in part be implemented in either software or hardware. It should further be noted that any reference signs do not limit the scope of the claims, and that several "means", "devices", and "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

Definitions

| | |
|---|---|
| GTP | GPRS Tunneling Protocol |
| GRX | GPRS Roaming eXchange (inter PLMN network provided by specific network providers for international GPRS traffic) |
| IE | Information Element ("protocol parameter") |
| LI | Lawful Intercept |
| NAT-PT | Network Address Translation - Protocol Translation |
| NW | Network |
| OTS | One Tunnel Solution |
| PDN | Packet Data Network |
| PDP | Packet Data Protocol |

PDP Context A tunnel established between a terminal and a GGSN in a 3GPP network. The tunnel is e.g. used for tunneling IP packets between the UE and Internet and or operator provided service networks.

The term PDP Context is in some contexts also used for the set of parameters used to manage one PDP context in one node (e.g. a SGSN or GGSN).

| | |
|---|---|
| PLMN | Public Land Mobile Network |
| HPLMN | Home PLMN (the home network for a subscriber) |
| VPLMN | Visited PLMN (the network a subscriber visits) |
| RA | Routing Area |
| RAU | Routing Area Update |
| TEID | Tunnel Endpoint Identifier |
| UE | User Equipment |

The invention claimed is:

1. A method for roaming of a wireless mobile communication unit between Public Land Mobile Networks (PLMN) comprising:
sending a context request from a second service support node in a second PLMN to a first service support node in a first PLMN;
receiving a context response in the second service support node from the first service support node;
sending a context acknowledgement from the second service support node to the first service support node;
sending a relocate Packet Data Protocol (PDP) context request from the second service support node to a second proxy gateway support node in the second PLMN;

sending an update PDP context request to a home gateway support node in a Home PLMN of the wireless mobile communication unit from the second proxy gateway support node;

receiving in the second proxy gateway support node an update PDP context response;

sending a relocate PDP context response to the second service support node from the second proxy gateway support node;

sending an update location message from the second service support node to a home location register in the Home PLMN of the wireless mobile communication unit; and receiving an update location acknowledgement message in the second service support node from the home location register.

2. The method according to claim 1, wherein the second proxy gateway support node acts as an intermediate node for all control communication in the steps of:

sending a context request from a second service support node in a second PLMN to a first service support node in a first PLMN;

receiving a context response in the second service support node from the first service support node; and sending a context acknowledgement from the second service support node to the first service support node.

3. The method according to claim 2, wherein both the first proxy gateway support node and the second proxy gateway support node act as intermediate nodes for all control communication in the steps of:

sending a context request from a second service support node in a second PLMN to a first service support node in a first PLMN;

receiving a context response in the second service support node from the first service support node; and sending a context acknowledgement from the second service support node to the first service support node.

4. The method according to claim 1, wherein a first proxy gateway support node located in the first PLMN acts as an intermediate node for all control communication in the steps of:

sending a context request from a second service support node in a second PLMN to a first service support node in a first PLMN;

receiving a context response in the second service support node from the first service support node; and sending a context acknowledgement from the second service support node to the first service support node.

5. The method according to claim 1, further comprising the steps of:

receiving a cancel location message from the home location register in the Home PLMN of the wireless mobile communication unit;

sending a delete relocated Packet Data Protocol (PDP) context request from the first service support node to a first proxy gateway support node in the first PLMN;

sending a delete relocated PDP context response to the first service support node from the first proxy gateway support node; and sending a cancel location acknowledgement message to the home location register.

6. The method according to claim 1, further comprising the steps of receiving traffic counting information from user equipment in the service nodes;

combining traffic counting information from the user equipment with traffic counting information from the service nodes in a charging message; and sending the charging message to a home billing server.

7. A service support node for roaming between Public Land Mobile Networks (PLMN) in a wireless mobile communication network protocol, wherein the service support node is located in a current PLMN and arranged with a processing unit operable to:

send a context request to a first service support node in another PLMN for a user equipment;

receive a context response from the first service support node;

send a context acknowledgement to the first service support node;

send a relocate PDP context request to a second proxy gateway support node in the current PLMN;

receive a relocate PDP context response from the second proxy gateway support node;

send an update location message to a home location register of the user equipment; and receive an update location acknowledgement message from the home location register.

8. The service support node according to claim 7, wherein the processing unit is operable to:

receive a cancel location message from the home location register;

send a delete relocated PDP context request to a first proxy gateway support node;

receive a delete relocated PDP context response from a first proxy gateway support node; and send a cancel location acknowledgement message to the home location register.

9. A proxy gateway support node for roaming between Public Land Mobile Network (PLMN) areas in a mobile wireless communication network, wherein the proxy support node is arranged with a processing unit operable to:

receive a relocate Packet Data Protocol (PDP) context request from a second service support node;

send an update PDP context request to a home gateway support node;

receive an update PDP context response from the home gateway support node; and send a relocate PDP context response to the second service support node.

10. The proxy gateway support node according to claim 9, wherein the processing unit is operable to:

receive a delete relocated Packet Data Protocol (PDP) context request from a first service support node; and send a delete relocated PDP context response to the first service support node.

11. A mobile communication infrastructure network arranged to handle roaming between different Public Land Mobile Network (PLMN) areas, comprising at least one service support node;

at least one gateway support node; and at least one proxy gateway support node wherein the proxy gateway support node is located between the gateway support node and the service support node and wherein the proxy gateway support node is operable to receive a relocate Packet Data Protocol (PDP) context request from a second service support node, send an update PDP context request to a home gateway support node, receive an update PDP context response from the home gateway support node, and send a relocate PDP context response to the second service support node.

12. The mobile infrastructure network according to claim 11, wherein signaling within the mobile infrastructure network is performed between at least one service support node and at least one proxy gateway support node, while signaling outside the mobile infrastructure network is performed between at least one proxy gateway support node and one other proxy gateway support node or at least one gateway support node.

13. The network according to claim 12, further comprising a firewall located communicatively between the gateway support node and the proxy gateway support node on the home PLMN side or the visited PLMN side.

* * * * *

UNITED STATES PATENT AND TRADEMARK OFFICE
CERTIFICATE OF CORRECTION

| | | |
|---|---|---|
| PATENT NO. | : 8,218,490 B2 | Page 1 of 1 |
| APPLICATION NO. | : 12/377624 | |
| DATED | : July 10, 2012 | |
| INVENTOR(S) | : Rydnell et al. | |

It is certified that error appears in the above-identified patent and that said Letters Patent is hereby corrected as shown below:

In Column 3, Line 21, delete "register;" and insert -- register. --, therefor.

In Column 3, Line 45, delete "node;" and insert -- node. --, therefor.

In Column 4, Line 32, delete "invention;" and insert -- invention. --, therefor.

In Column 9, Line 2, delete "Cl" and insert -- C1 --, therefor.

In Column 10, Line 42, delete "ReI-6:" and insert -- Rel-6: --, therefor.

In Column 10, Line 52, delete "practice!" and insert -- practice. --, therefor.

In Column 10, Line 54, delete "lu" and insert -- Iu --, therefor.

In Column 13, Line 65, in Claim 6, delete "steps of" and insert -- steps of: --, therefor.

In Column 14, Line 57, in Claim 11, delete "comprising" and insert -- comprising: --, therefor.

Signed and Sealed this
Sixth Day of November, 2012

David J. Kappos
*Director of the United States Patent and Trademark Office*